United States Patent
Song et al.

(10) Patent No.: US 8,863,784 B2
(45) Date of Patent: Oct. 21, 2014

(54) VISCOELASTIC DAMPED JUMPERS

(75) Inventors: Gangbing Song, Houston, TX (US);
Chris Kocurek, Houston, TX (US);
Devendra Patil, Houston, TX (US); He Ma, Houston, TX (US); Mithun Singla, Houston, TX (US); Huigang Xiao, Heilongjiang (CN)

(73) Assignee: Cameron International Corporation, Houston, TX (US)

( * ) Notice: Subject to any disclaimer, the term of this patent is extended or adjusted under 35 U.S.C. 154(b) by 1202 days.

(21) Appl. No.: 12/765,655

(22) Filed: Apr. 22, 2010

(65) Prior Publication Data
US 2011/0259463 A1 Oct. 27, 2011

(51) Int. Cl.
*F16L 9/14* (2006.01)

(52) U.S. Cl.
USPC ............ 138/140; 138/137; 138/141; 138/149

(58) Field of Classification Search
USPC ........ 138/137, 141, 140, 149, 148; 428/36.91
See application file for complete search history.

(56) References Cited

U.S. PATENT DOCUMENTS

| | | |
|---|---|---|
| 1,973,510 A | 9/1934 | Schieferstein |
| 2,195,041 A | 3/1940 | Von Schlippe |
| 2,715,951 A | 8/1955 | Lieber |
| 3,757,761 A | 9/1973 | Izuta |
| 3,932,056 A | 1/1976 | Tai |
| 4,761,925 A | 8/1988 | Fukahori et al. |
| 4,852,848 A | 8/1989 | Kucera |
| 4,950,528 A | 8/1990 | Iizuka et al. |
| 4,962,826 A | 10/1990 | House |
| 5,030,490 A * | 7/1991 | Bronowicki et al. ........ 428/36.4 |
| 5,193,644 A | 3/1993 | Hart et al. |
| 5,250,132 A * | 10/1993 | Lapp et al. ..................... 156/173 |
| 5,342,465 A * | 8/1994 | Bronowicki et al. .......... 156/175 |

(Continued)

FOREIGN PATENT DOCUMENTS

| | | |
|---|---|---|
| DE | 2056164 A1 | 5/1972 |
| EP | 0412816 | 2/1991 |

(Continued)

OTHER PUBLICATIONS

PCT Search Report and Written Opinion of PCT/US2011/046652, mailed on Dec. 14, 2011.

(Continued)

*Primary Examiner* — Patrick F Brinson
(74) *Attorney, Agent, or Firm* — Fletcher Yoder, P.C.

(57) ABSTRACT

A system, in certain embodiments, includes a multi-layer composite strip of pipe dampening materials, comprising a first layer of a first material, a second layer of a second material disposed adjacent to the first layer of material, and a third layer of a third material disposed adjacent to the second layer of material, wherein the second material comprises a viscoelastic material, and wherein the multi-layer composite strip of pipe dampening materials is configured to be affixed to an outer surface of a section of pipe. In certain embodiments, the first layer and the third layer may have stiffness values that are substantially different from each other. The difference in stiffness values may enable relative motion in the first layer and the third layer to be generated during vibration of the section of pipe, and the energy may be dissipated by the viscoelastic material, thereby dampening vibration of the section of pipe. In certain embodiments, multiple strips of pipe dampening materials may be used.

26 Claims, 4 Drawing Sheets

(56) References Cited

U.S. PATENT DOCUMENTS

| | | | |
|---|---|---|---|
| 5,366,198 A | | 11/1994 | Dickinson |
| 5,507,477 A | * | 4/1996 | Manning et al. ........... 267/140.3 |
| 5,595,448 A | | 1/1997 | Harada |
| 5,678,840 A | | 10/1997 | Simonian |
| 5,971,375 A | | 10/1999 | Simonian et al. |
| 6,125,977 A | | 10/2000 | Nekomoto et al. |
| 6,129,177 A | | 10/2000 | Gwinn |
| 6,309,985 B1 | | 10/2001 | Virnelson et al. |
| 6,397,988 B1 | | 6/2002 | Ptak |
| 6,893,733 B2 | * | 5/2005 | Obeshaw ....................... 428/593 |
| 6,949,282 B2 | * | 9/2005 | Obeshaw ....................... 428/131 |
| 8,371,338 B2 | * | 2/2013 | Princell et al. ................. 138/149 |
| 2002/0006523 A1 | * | 1/2002 | Obeshaw ....................... 428/593 |
| 2002/0030315 A1 | | 3/2002 | Kato et al. |
| 2004/0105764 A1 | | 6/2004 | Kch |
| 2006/0169341 A1 | * | 8/2006 | Goetchius et al. .............. 138/30 |
| 2006/0191267 A1 | | 8/2006 | Song et al. |
| 2007/0068468 A1 | | 3/2007 | Irick et al. |
| 2008/0034884 A1 | | 2/2008 | Song et al. |
| 2009/0022450 A1 | | 1/2009 | Song et al. |

FOREIGN PATENT DOCUMENTS

| | | |
|---|---|---|
| EP | 0756673 A1 | 2/1997 |
| EP | 1132644 A2 | 9/2001 |
| JP | 57137666 A | 8/1982 |
| JP | 59050243 A | 3/1984 |
| JP | 2001317680 | 11/2001 |
| JP | 2009035864 A | 2/2009 |
| SU | 1262156 A2 | 10/1986 |
| SU | 1397642 A1 | 6/1988 |

OTHER PUBLICATIONS

U.S. Appl. No. 12/917,456, filed Nov. 1, 2010, Gangbing Song.

U.S. Appl. No. 12/620,506, filed Nov. 17, 2009, Omar M. Kabir.

U.S. Appl. No. 12/631,424, filed Dec. 4, 2009, Kocurek et al.

International Preliminary Report and Written Opinion PCT/US2011/022652 mailed Nov. 1, 2012.

Search Report and Written Opinion PCT/US2011/022652 Jun. 1, 2011.

* cited by examiner

US 8,863,784 B2

VISCOELASTIC DAMPED JUMPERS

FIELD OF THE INVENTION

The present invention relates to vibration reduction. More particularly, the present invention relates to the use of viscoelastic materials to dampen the vibration of sub-sea jumper systems.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Many types of pipe, such as pipes used in sub-sea jumper systems, may be subjected to the flow of fluids across their surfaces (both internal and external). The flow of fluids may lead to vibration of the pipe, such as vortex-induced vibration. Over time, the vibration can lead to damage and/or failure of the pipe.

BRIEF DESCRIPTION OF THE DRAWINGS

These and other features, aspects, and advantages of the present invention will become better understood when the following detailed description of certain exemplary embodiments is read with reference to the accompanying drawings in which like characters represent like parts throughout the drawings, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components.

Certain exemplary embodiments of the present invention include systems and methods for dampening the vibration of sections of pipe, such as pipes used in sub-sea jumper systems. In particular, the disclosed embodiments include encasing pipes within a viscoelastic material. More specifically, in certain embodiments, the pipe may be wrapped within a first layer of a first material, a second layer of a second material, and a third layer of a third material. The second material may include the viscoelastic material, whereas the first and third materials may generally not be viscoelastic materials. Rather, the first and third layers of materials may include first and third materials, wherein the stiffnesses of the first and third layers are substantially different. As the pipe vibrates (e.g., bends longitudinally), because the stiffnesses of the first and third layers are substantially different, the first and third layers may move longitudinally with respect to each other such that the kinetic energy is dissipated through the relative motion of internal layers of the second material (e.g., the viscoelastic material), thereby dampening the vibration of the pipe.

Figure 1:
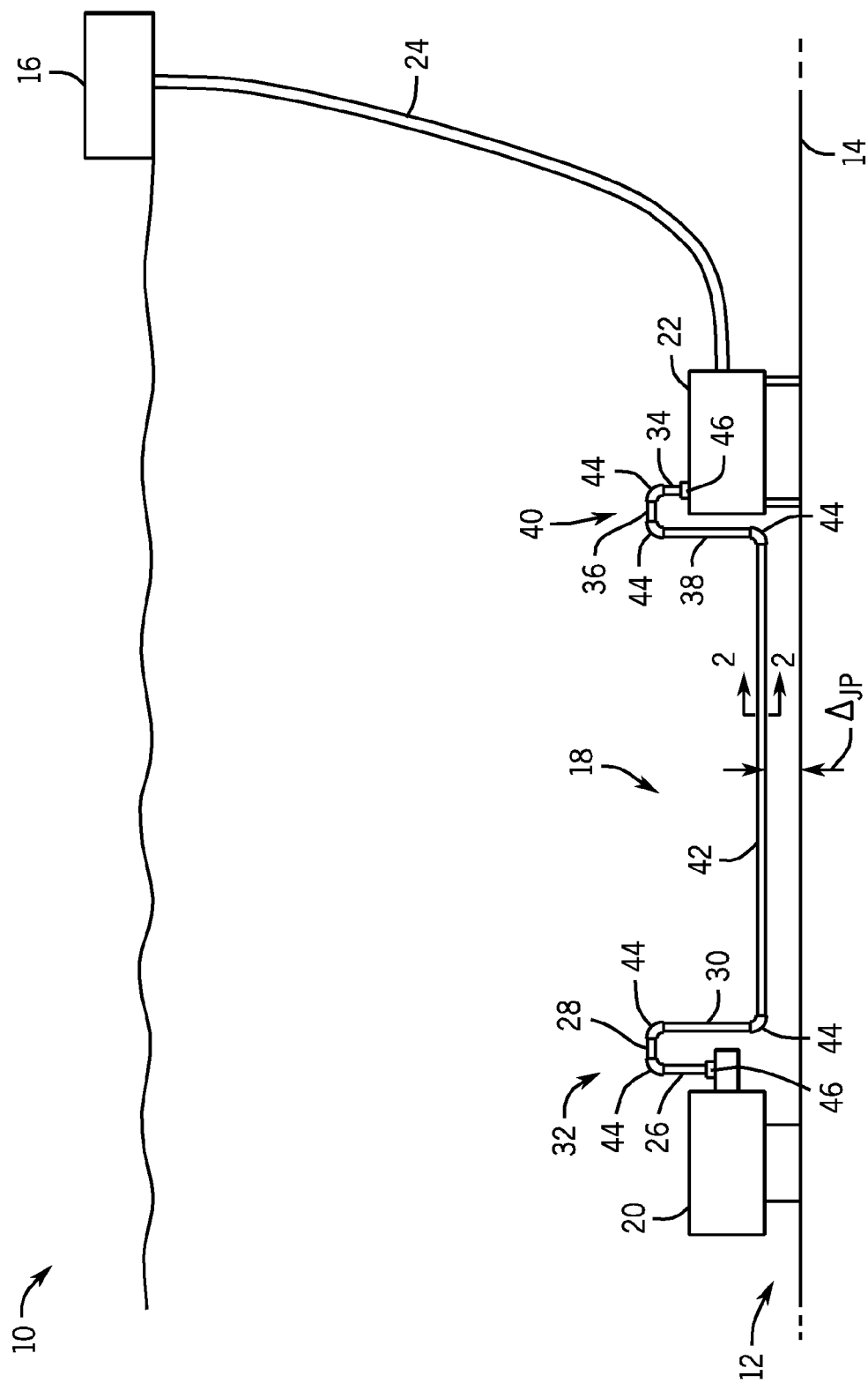
FIG. 1 is a schematic diagram of an embodiment of a sub-sea resource extraction system having a jumper system that may utilize a viscoelastic material to dampen vibration.

FIG. 1 is a schematic diagram of an embodiment of a sub-sea resource extraction system 10. The sub-sea resource extraction system 10 may be used to extract oil, natural gas, and other natural resources from a well 12, located on a sub-sea floor 14, to an extraction point at a surface location 16 (e.g., an on-shore processing facility, an off-shore rig, or any other extraction point). The sub-sea resource extraction system 10 may also be used to inject fluids, such as chemicals, steam, and so forth, into the well 12. These injected fluids may aid the extraction of resources from the well 12. The sub-sea resource extraction system 10 may, in certain embodiments, include a jumper system 18 connected to a Christmas tree 20 of the well 12 and a manifold 22. The oil, natural gas, or other resources may, in certain embodiments, be collected at the well 12, and travel through the Christmas tree 20 to the manifold 22 through the jumper system 18. From the manifold 22, the oil, natural gas, or other resources may be transported to the surface location 16 via export flow lines 24.

As illustrated, the jumper system 18 may include a series of pipes specifically configured to connect the Christmas tree 20 to the manifold 22. For example, the jumper system 18 may include a first vertical pipe 26 extending generally upwardly from the Christmas tree 20, a first horizontal pipe 28 extending generally horizontally from the first vertical pipe 26 toward the manifold 22, and a second vertical pipe 30 extending generally downwardly from the first horizontal pipe 28 toward the sub-sea floor 14. As such, these three pipes 26, 28, 30 generally form a first u-shaped pipe formation 32. In addition, the jumper system 18 may include a third vertical pipe 34 extending generally upwardly from the manifold 22, a second horizontal pipe 36 extending generally horizontally from the third vertical pipe 34 toward the Christmas tree 20, and a fourth vertical pipe 38 extending generally downwardly from the second horizontal pipe 36 toward the sub-sea floor 14. As such, these three pipes 34, 36, 38 generally form a second u-shaped pipe formation 40. In addition, the jumper system 18 may include a main jumper pipe 42 extending generally horizontally from the bottom of the second vertical pipe 30 near the Christmas tree 20 to the bottom of the fourth vertical pipe 38 near the manifold 22.

The jumper system 18 may also include several connectors for connecting the pipes 26, 28, 30, 34, 36, 38, and 42 to the Christmas tree 20, manifold 22, and each other. For example, the jumper system 18 may include several 90-degree elbows 44 between adjacent pipes 26, 28, 30, 34, 36, 38, and 42. In addition, the jumper system 18 may include pressure connectors 46 at either end of the jumper system 18 for connecting to the Christmas tree 20 and the manifold 22. For example, a pressure connector 46 may connect the first vertical pipe 26 to the Christmas tree 20 and another pressure connector 46 may connect the third vertical pipe 34 to the manifold 22.

The specific sizes, configurations, and characteristics of the pipes 26, 28, 30, 34, 36, 38, and 42 of the jumper system 18 may vary between specific implementations. However, common outside diameters for the pipes 26, 28, 30, 34, 36, 38, and 42 may fall within a range of approximately 4.5 inches to 10.75 inches (e.g., nominal pipe sizes of approximately 4 inches to 10 inches). For example, in certain embodiments, the outside diameters of the pipes 26, 28, 30, 34, 36, 38, and 42 may be 4.5 inches, 6.625 inches, 8.625 inches, 10.75 inches, and so forth. However, in other embodiments, the outside diameters of the pipes 26, 28, 30, 34, 36, 38, and 42 may fall within a range of approximately 2.375 inches to 24 inches (e.g., nominal pipe sizes of approximately 2 inches to 24 inches), or even greater. For example, in certain embodiments, the outside diameters of the pipes 26, 28, 30, 34, 36, 38, and 42 may be 2.375 inches, 3.5 inches, 4.5 inches, 6.625 inches, 8.625 inches, 10.75 inches, 12.75 inches, 14 inches, 16 inches, 18 inches, 20 inches, 22 inches, 24 inches, or even greater.

Furthermore, the wall thicknesses of the pipes 26, 28, 30, 34, 36, 38, and 42 may, in certain embodiments, fall within a range of approximately 0.5 inch to 2.0 inches, or even greater. For example, the wall thicknesses of the pipes 26, 28, 30, 34, 36, 38, and 42 may be 0.5 inch, 0.625 inch, 0.75 inch, 0.875 inch, 1.0 inch, 1.125 inch, 1.25 inch, 1.375 inch, 1.5 inch, 1.625 inch, 1.75 inch, 1.875 inch, 2.0 inches, or even greater. In certain embodiments, all of the pipes 26, 28, 30, 34, 36, 38, and 42 of the jumper system 18 may have the same outside diameters and wall thicknesses. However, in other embodiments, the outside diameters and wall thicknesses may vary between/across the individual pipes 26, 28, 30, 34, 36, 38, and 42. Indeed, the outside diameters and wall thicknesses described herein are merely exemplary and not intended to be limiting.

All of the pipes 26, 28, 30, 34, 36, 38, and 42 of the jumper system 18 are generally rigid and are generally connected to the Christmas tree 20, manifold 22, and each other in a rigid manner using generally rigid connectors 44, 46. In other words, the pipes 26, 28, 30, 34, 36, 38, and 42 and the associated connectors 44, 46 generally do not include flexible materials (e.g., flexible pipe). Rather, for example, in certain embodiments, the pipes 26, 28, 30, 34, 36, 38, and 42 may be comprised of steel pipe and the connectors 44, 46 connecting the pipes 26, 28, 30, 34, 36, 38, and 42 to the Christmas tree 20, manifold 22, and each other may generally not include flexible connectors (e.g., rotating connectors, translating connectors, and so forth). In certain embodiments, the pipes 26, 28, 30, 34, 36, 38, and 42 may be comprised of AISI 4130 low alloy steel with a minimum yield strength of 75,000 pounds per square inch (psi). However, in other embodiments, other materials may be used for the pipes 26, 28, 30, 34, 36, 38, and 42.

The configuration of generally rigid pipes 26, 28, 30, 34, 36, 38, and 42 of the jumper system 18 illustrated in FIG. 1 may lead to several tangible benefits. For example, because the pipes 26, 28, 30, 34, 36, and 38 of the first and second u-shaped pipe formations 32, 40 are generally rigid, the main jumper pipe 42 remains elevated from the sub-sea floor 14 by a generally constant distance $\Delta_{JP}$. As such, the main jumper pipe 42 may be held very close to the surface of the sub-sea floor 14, where currents may be somewhat reduced, thereby reducing the vibratory fatigue on the main jumper pipe 42. In addition, the main jumper pipe 42 may be isolated from lying directly on the surface of the sub-sea floor 14, where contact with the surface of the sub-sea floor 14 may abrade the main jumper pipe 42 over time, thereby reducing the overall life of the main jumper pipe 42. Furthermore, the first and second u-shaped pipe formations 32, 40 enable a certain degree of horizontal and vertical vibration, allowing for some freedom of movement of the jumper system 18, again thereby reducing the vibratory fatigue on the main jumper pipe 42.

Figure 2:
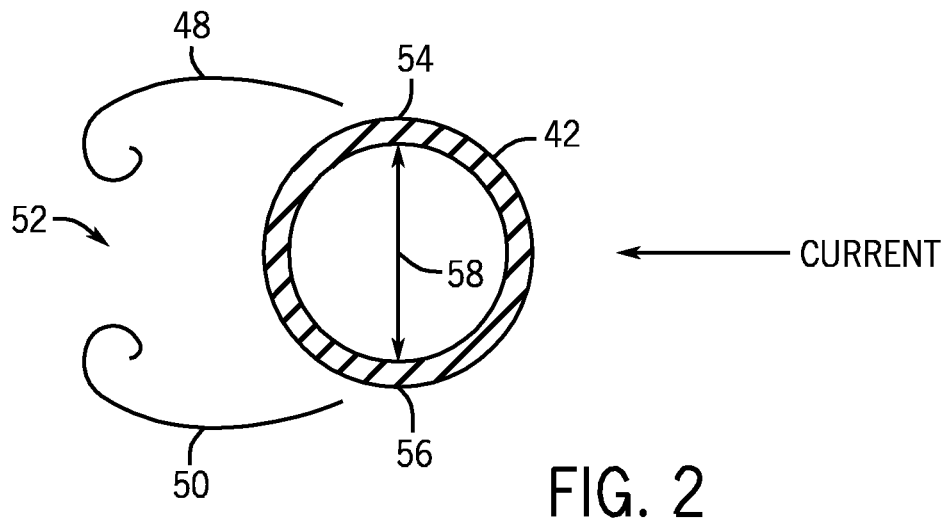
FIG. 2 is a cross-sectional view of a main jumper pipe of the jumper system taken along line 2-2 of FIG. 1, illustrating vortices that may induce vibration.

However, this configuration of generally rigid pipes 26, 28, 30, 34, 36, 38, and 42 of the jumper system 18 may not completely eliminate vibration of the main jumper pipe 42. One of the main causes of vibration of the main jumper pipe 42 may be vortex-induced vibration. Vortex-induced vibration is generally caused by currents flowing across the main jumper pipe 42 in a direction generally orthogonal to the plane of FIG. 1 (e.g., into and out of FIG. 1). For example, FIG. 2 is a cross-sectional view of the main jumper pipe 42 of the jumper system 18 taken along line 2-2 of FIG. 1. As the current flows across the main jumper pipe 42 in a generally horizontal manner, the current flow is slowed by contact with the surface of the main jumper pipe 42. Vortices 48, 50 may be formed on a back side 52 of the main jumper pipe 42, away from the direction of flow of the current. However, these vortices 48, 50 are generally not synchronous. Rather, for example, a top vortex 48 may first be formed, followed by a bottom vortex 50, followed by another top vortex 48, and so forth. This pattern of successive vortices 48, 50 may cause oscillating forces on top and bottom surfaces 54, 56 of the main jumper pipe 42. As such, the oscillating forces may cause vertical vibration of the main jumper pipe 42, as illustrated by arrow 58. There may also be vibrations in the direction of current.

Figure 3:
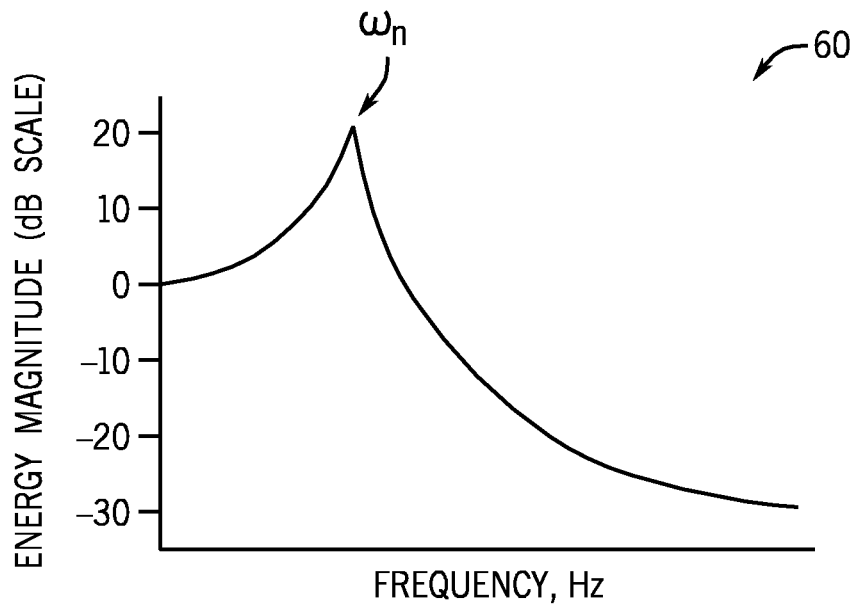
FIG. 3 is an exemplary chart of energy magnitude versus frequency of the jumper system of FIG. 1 without a viscoelastic material to dampen vibration.

This vortex-induced vibration may lead to increased fatigue of the pipes 26, 28, 30, 34, 36, 38, and 42 of the jumper system 18 over time. In general, the energy magnitude of the jumper system 18 may be a function of the frequency of the vortex-induced vibration. FIG. 3 is an exemplary chart 60 of energy magnitude versus frequency of the jumper system 18 of FIG. 1. The degree of damping and degree of damage are directly proportional to the energy magnitude. The energy magnitude illustrated in FIG. 3 is on a 20 $\log_{10}$ decibel scale. For example, when the vortex-induced vibration is at a certain (very low) frequency, the energy magnitude may be at a reference level of 0 dB, meaning that the degree of damping is at a reference level of 100%. However, when the vortex-induced vibration is near the natural frequency $\omega_n$ of the jumper system 18, as illustrated in FIG. 3, the energy magnitude may be at a level of 1000% or ten times (e.g., 20 dB) of the reference level. In other words, at lower frequencies, the energy magnitude may be at somewhat expected levels. However, when the vortex-induced vibration frequency is near the natural frequency $\omega_n$ of the jumper system 18, the energy magnitude is substantially greater. However, at even higher frequencies, the energy magnitude may asymptotically decrease to levels of approximately 3.163% (e.g., −30 dB) of the reference level. The illustrated energy magnitudes of FIG. 3 are merely exemplary and not intended to be limiting.

The natural frequency $\omega_n$ of the jumper system 18 is the frequency at which the jumper system 18 vibrates with the largest energy magnitude when set in motion. In actuality, the jumper system 18 may have multiple natural frequencies $\omega_n$ (i.e. harmonic frequencies) above the natural frequency $\omega_n$ illustrated in FIG. 3. However, for simplicity, only the fundamental natural frequency $\omega_n$ is illustrated. In addition, the other natural frequencies $\omega_n$ generally tend to have magnitudes that are less than the fundamental natural frequency $\omega_n$. Therefore, the fundamental natural frequency $\omega_n$ is generally the most important frequency to be considered when attempting to minimize the energy magnitude of the jumper system 18. Indeed, as the frequency of the vortex-induced vibration approaches the fundamental natural frequency $\omega_n$ illustrated in FIG. 3, the jumper system 18 may become "locked-in." In other words, the jumper system 18 may become locked into a damage-inducing oscillating mode, which may be difficult to terminate. Therefore, the ability to minimize the maximum energy magnitude and/or change the fundamental natural frequency $\omega_n$ may lead to lower overall damage to the jumper system 18, thereby extending the useful life of the jumper system 18.

Figure 4:
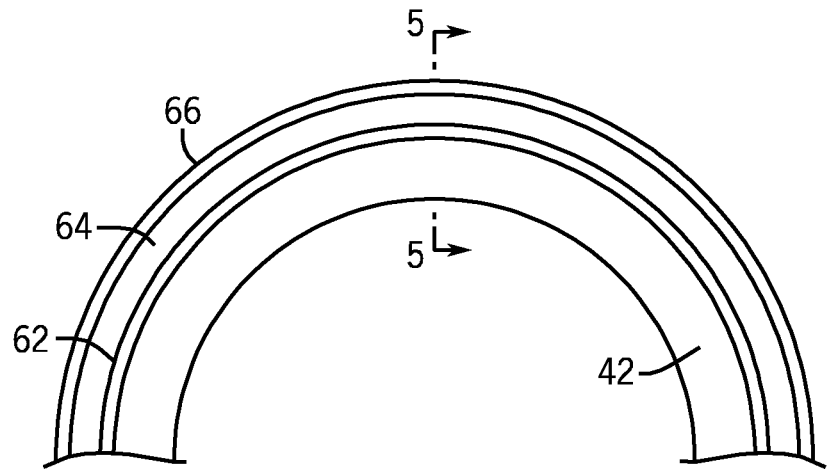
FIG. 4 is a partial cross-sectional view of the main jumper pipe of FIG. 2 encased within a viscoelastic material to dampen vibration.

In certain embodiments, the energy magnitude of the jumper system 18 may be minimized by encasing the pipes 26, 28, 30, 34, 36, 38, and 42 of the jumper system 18 within viscoelastic materials, thereby dampening the vortex-induced vibration of the pipes 26, 28, 30, 34, 36, 38, and 42. For example, FIG. 4 is a partial cross-sectional view of the main jumper pipe 42 of FIG. 2 encased within a viscoelastic material to dampen vibration. However, all of the pipes 26, 28, 30, 34, 36, 38, and 42 of the jumper system 18 may be similarly encased within viscoelastic materials. The illustrated embodiment includes first, second, and third layers of material 62, 64, 66 disposed about the main jumper pipe 42. The first and third layers of material 62, 66 are generally not comprised of viscoelastic materials. For example, in certain embodiments, the first and third layers of material 62, 66 may be comprised of aluminum foil, stainless steel foil, steel plates, metal strips, or other types of metal layers. In certain embodiments, the first and third layers 62, 66 may be comprised of the same materials, whereas in other embodiments, the first and third layers 62, 66 may be comprised of different materials. The second layer of material 64 may consist essentially of viscoelastic materials. For example, in certain embodiments, the second layer of material 64 may consist essentially of a viscoelastic polymer. In addition, in other embodiments, the second layer of material 64 may include only viscoelastic materials.

The relative dimensions of the first, second, and third layers of material 62, 64, 66 with respect to the main jumper pipe 42 illustrated in FIG. 4 may not be representative of the actual dimensions utilized. Rather, the illustrated relative thicknesses of the first, second, and third layers of material 62, 64, 66 with respect to the main jumper pipe 42 may be different than actually utilized in order to aid in the illustration of the first, second, and third layers of material 62, 64, 66. For example, in certain embodiments, the wall thickness of the main jumper pipe 42 may be 0.5 inch, 0.625 inch, 0.75 inch, 0.875 inch, 1.0 inch, 1.125 inch, 1.25 inch, 1.375 inch, 1.5 inch, 1.625 inch, 1.75 inch, 1.875 inch, 2.0 inches, or even greater. However, in certain embodiments, the summation of the thicknesses of the first, second, and third layers of material 62, 64, 66 may fall within a range of only approximately 5 mils (i.e., thousandths of an inch) to 50 mils. For example, in certain embodiments, the summation of the thicknesses of the first, second, and third layers of material 62, 64, 66 may be 5 mils, 10 mils, 15 mils, 20 mils, 25 mils, 30 mils, 35 mils, 40 mils, 45 mils, 50 mils, 60 mils, 70 mils, 80 mils, 90 mils, 100 mils, 150 mils, 200 mils, 250 mils, or greater, or any value in between.

In general, the second layer of material 64 may be thicker than the first and third layers of material 62, 66, whereas the first and third layers of material 62, 66 may generally be the same. In certain embodiments, the second layer of material 64 may be thicker than the first and third layers of material 62, 66 by a factor of approximately 1.5 to 4.0. For example, in certain embodiments, the second layer of material 64 may be thicker than the first and third layers of material 62, 66 by a factor of 1.5, 2.0, 2.5, 3.0, 3.5, 4.0, or greater, or any value in between. More specifically, in certain embodiments, the thickness of the second layer of material 64 may fall within a range of approximately 2 mils to 30 mils. For example, in certain embodiments, the thickness of the second layer of material 64 may be 2 mils, 3 mils, 4 mils, 5 mils, 6 mils, 7 mils, 8 mils, 9 mils, 10 mils, 11 mils, 12 mils, 13 mils, 14 mils, 15 mils, 16 mils, 17 mils, 18 mils, 19 mils, 20 mils, 21 mils, 22 mils, 23 mils, 24 mils, 25 mils, 26 mils, 27 mils, 28 mils, 29 mils, 30 mils, or greater, or any value in between. In contrast, in certain embodiments, the thicknesses of the first and third layers of material 62, 66 may fall within a range of approximately 1 mil to 10 mils. For example, in certain embodiments, the thicknesses of the first and third layers of material 62, 66 may be 1 mil, 2 mils, 3 mils, 4 mils, 5 mils, 6 mils, 7 mils, 8 mils, 9 mils, 10 mils, or greater, or any value in between.

Figure 5:
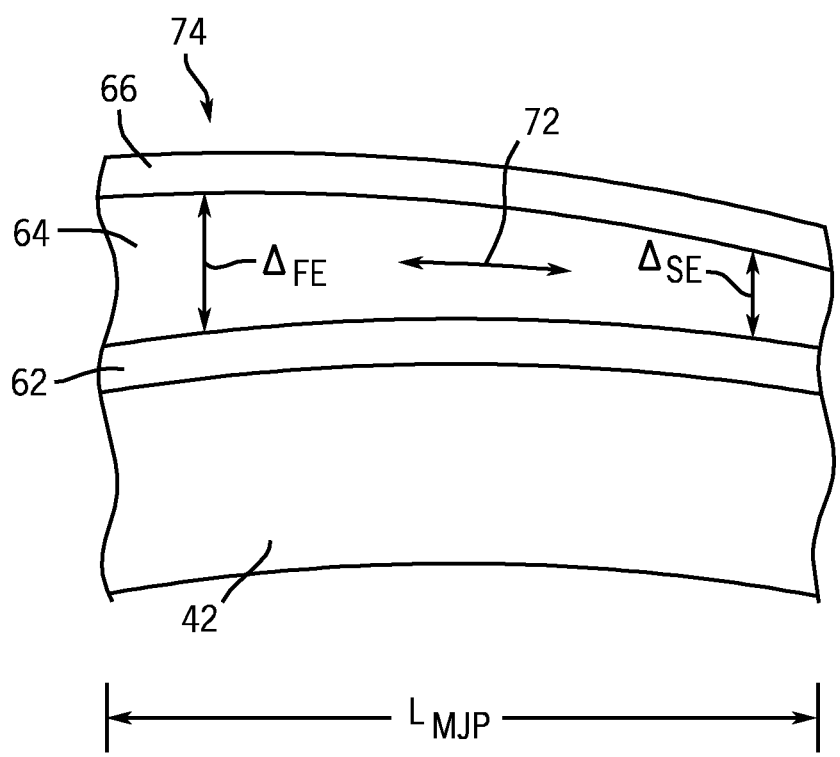
FIGS. 5 and 6 are partial cross-sectional views of the main jumper pipe taken along line 5-5 of FIG. 4.
Figure 6:
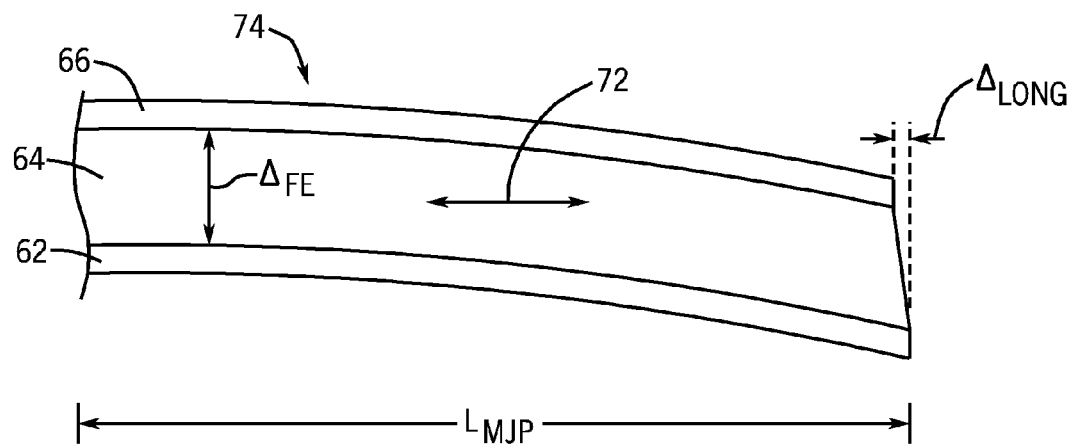

The detrimental effects of the vortex-induced vibration of the pipes 26, 28, 30, 34, 36, 38, and 42 of the jumper system 18 may be minimized by the physical interaction between the first, second, and third layers of material 62, 64, 66 around the pipes 26, 28, 30, 34, 36, 38, and 42. For example, FIGS. 5 and 6 are partial cross-sectional views of the main jumper pipe 42 taken along line 5-5 of FIG. 4. As illustrated, the vortex-induced vibration may cause the main jumper pipe 42 to bend across the longitudinal length $L_{MJP}$ of the main jumper pipe 42. Again, the relative dimensions of the main jumper pipe 42 and the first, second, and third layers of material 62, 64, 66 may not be representative of the actual dimensions utilized. Rather, the relative thicknesses of the first, second, and third layers of material 62, 64, 66 with respect to the main jumper pipe 42 are again illustrated as different than may actually be utilized in order to aid in the illustration of the first, second, and third layers of material 62, 64, 66. In addition, the longitudinal length $L_{MJP}$ of the main jumper pipe 42 may not be representative of the entire length of the main jumper pipe 42. Rather, the horizontal length $L_{MJP}$ of the main jumper pipe 42 illustrated in FIG. 5 may instead represent a finite section of the main jumper pipe 42.

As the vortex-induced vibration creates oscillating vertical vibration of the main jumper pipe 42, such as illustrated by arrow 58 in FIG. 2, the main jumper pipe 42 may bend along the longitudinal length $L_{MJP}$ of the main jumper pipe 42. More specifically, the first, second, and third layers of material 62, 64, 66 may similarly bend along the longitudinal length $L_{MJP}$ of the main jumper pipe 42. Assuming that the stiffnesses of the first and third layers of material 62, 66 are sufficiently different, the first-end distance $\Delta_{FE}$ and the second-end distance $\Delta_{SE}$ may vary. In other words, the first and third layers of material 62, 66 may bend by different amounts. However, the first layer of material 62 remains fixedly coupled (e.g., adhesively affixed) to the main jumper pipe 42.

Therefore, the third layer of material 66 moves relative to both the first layer of material 62 and the main jumper pipe 42.

As the bending of the first and third layers of material 62, 66 varies, the first and third layers 62, 66 may move relative to each other along the longitudinal length $L_{MJP}$ of the main jumper pipe 42, as illustrated by arrow 72 in FIGS. 5 and 6. For example, assuming that the first layer of material 62 has a greater stiffness than the third layer of material 66, the third layer of material 66 may bend more than the first layer of material 62 and, thus, the first-end distance $\Delta_{FE}$ may be greater than the second-end distance $\Delta_{SE}$. Conversely, assuming that the third layer of material 66 has a greater stiffness than the first layer of material 62, the first layer of material 62 may bend more than the third layer of material 66 and, thus, the second-end distance $\Delta_{SE}$ may be greater than the first-end distance $\Delta_{FE}$. In both of these cases, the first and third layers of material 62, 66 may move relative to each other along the longitudinal length $L_{MJP}$ of the main jumper pipe 42, as illustrated by arrow 72. As illustrated in FIG. 6, the relative movement and bending of the first and third layers of material 62, 66 may lead to a relative longitudinal difference $\Delta_{LONG}$ between the first and third layers of material 62, 66.

The relative movement and bending of the first and third layers of material 62, 66 relative to each other generates relative displacement of the bond between the first and second layers of material 62, 64 and the bond between the second and third layers of material 64, 66. The viscoelastic material of the second layer of material 64 may be capable of converting the vibration energy into thermal energy by the relative movement of its internal layers. In other words, the viscoelastic material of the second layer of material 64 may be capable of dissipating the energy by the longitudinal movement of the first and third layers of material 62, 66 relative to each other. The dissipation of this energy within the viscoelastic second layer of material 64, in turn, may dampen the vortex-induced vibration on the main jumper pipe 42.

Therefore, as described above, both the first and third layers of material 62, 66 may be solid layers of material, such that the relative longitudinal movement 72 of the first and third layers of material 62, 66 may generate the relative displacement, which may dissipate the energy in the viscoelastic second layer of material 64. In other words, the first and third layers of material 62, 66 may not be painted onto the main jumper pipe 42. Rather, in certain embodiments, the first layer of material 62 may be capable of being adhesively affixed to the outer surface of the main jumper pipe 42. For example, at least one side of the first layer of material 62 may include an adhesive layer. Conversely, in general, the viscoelastic second layer of material 64 may be applied on top of the first layer of material 62 by any appropriate method, including spraying, brushing, dipping, or otherwise applying the viscoelastic material onto the first layer of material 62. However, again, the third layer of material 66 may be a solid layer of material applied on top of the viscoelastic second layer of material 64. Thus, the third layer of material 66 may also include an adhesive layer.

For convenience, in certain embodiments, the first, second, and third layers of material 62, 64, 66 may be assembled together at a separate facility before being applied to the pipes 26, 28, 30, 34, 36, 38, and 42 of the jumper system 18. For example, in certain embodiments, the first, second, and third layers of material 62, 64, 66 may be combined into integrated strips of materials 74 (e.g., including one first layer of material 62, one second layer of material 64, and one third layer of material 66) at a first facility, wherein the integrated strips of materials 74 may be applied to the pipes 26, 28, 30, 34, 36, 38, and 42 at a second facility. More specifically, the integrated strips of materials 74 may be configured to wrap around the outer surface of the pipes 26, 28, 30, 34, 36, 38, and 42. Indeed, in certain embodiments, the integrated strips of materials 74 may be wrapped around the pipes 26, 28, 30, 34, 36, 38, and 42 in multiple layers (e.g., 1, 2, 3, 4, 5, 6, 7, 8, 9, 10, or more times).

In addition, in certain embodiments, the integrated strips of materials 74 may include only a second and third layer of material 64, 66. In other words, the second layer of material 64 (e.g., the viscoelastic layer) of the integrated strips of materials 74 may be configured to directly attach to an outer surface of the pipes 26, 28, 30, 34, 36, 38, and 42. In this embodiment, the relative movement between the third layer of material 66 and the pipe to which the integrated strips of materials 74 are attached may generate the relative motion, which helps to dissipate the energy in the second layer of material 64 (e.g., the viscoelastic layer).

In addition, as described above, at least one side of the integrated strips of materials 74 may have an adhesive layer, enhancing adhesion of the integrated strips of materials 74 to the pipes 26, 28, 30, 34, 36, 38, and 42. In certain embodiments, once the integrated strips of materials 74 have been wrapped around the pipes 26, 28, 30, 34, 36, 38, and 42 one or more times, an additional layer of insulation may be applied on top of the integrated strips of materials 74. By wrapping the integrated strips of materials 74 around the pipes 26, 28, 30, 34, 36, 38, and 42, the vibration dampening effects may become substantially multi-directional. In other words, the vibration dampening effects may be present around the entire 360 degree surfaces of the pipes 26, 28, 30, 34, 36, 38, and 42. Indeed, the vibration dampening effects may even be experienced in the longitudinal direction.

Dampening of the vortex-induced vibration may be enhanced whenever the energy dissipation within the viscoelastic second layer of material 64 is increased. As described above, the energy dissipation within the viscoelastic second layer of material 64 may be increased by ensuring that the first and third layers of material 62, 66 have stiffnesses that are sufficiently different from each other to create sufficient relative displacement between the first and third layers of material 62, 66. Stiffness is usually measured in units such as pound-force/inch (lb$_f$/in) or Newton/meter (N/m), since stiffness generally represents the amount of force required to bend, stretch, or compress an elastic body by a given strain displacement (i.e., distance). The stiffness of the first and third layers of material 62, 66 may be a function of differences between the materials used as well as differences in the thicknesses between the first and third layers of material 62, 66. In certain embodiments, the same material may be used for both the first and third layers of material 62, 66. However, the thicknesses of the first and third layers of material 62, 66 may be varied to ensure that the stiffness of the first layer of material 62 is sufficiently different that the stiffness of the third layer of material 66. For example, in certain embodiments, the thicknesses of the first and third layers of material 62, 66 may be different by 20%, 25%, 30%, 35%, 40%, 45%, 50%, or greater, or any value in between. In other embodiments, even though the thicknesses of the first and third layers of material 62, 66 may be substantially similar (e.g., within 2-5% of each other), different materials with substantially different Young's moduli (e.g., indicators of material stiffness) may be used for the first and third layers of material 62, 66. For example, in such embodiments, the Young's moduli of the first and third layers of material 62, 66 may be different by 20%, 25%, 30%, 35%, 40%, 45%, 50%, or greater, or any value in between.

Regardless, the difference between stiffnesses of the first and third layers of material 62, 66 may differ from each other by approximately 20% or greater. For example, in certain embodiments, the stiffnesses of the first and third layers of material 62, 66 may be different by 5%, 10%, 15%, 20%, 25%, 30%, 35%, 40%, 45%, 50%, 55%, 60%, 65%, 70%, 75%, 80%, 85%, 90%, 95%, 100%, or greater, or any value in between. As described above, in certain embodiments, the stiffness of the first layer of material 62 may be greater than the stiffness of the third layer of material 66, whereas in other embodiments, the stiffness of the third layer of material 66 may be greater than the stiffness of the first layer of material 62.

In addition, as described above, the second layer of material 64 may have dampening properties (e.g., damping ratio, loss modulus, and so forth) substantially greater than that of the first and third layers of material 62, 66. For example, in certain embodiments, the dampening properties of the second layer of material 64 may be greater than that of the first and third layers of material 62, 66 by a factor of 5, 10, 15, 20, 25, 30, 35, 40, 45, 50, or greater, or any value in between. The substantially higher dampening properties of the second layer of material 64 may lead to substantial reduction in the magnitude of response to vibration of the pipes 26, 28, 30, 34, 36, 38, and 42 of the jumper system 18.

Figure 7:
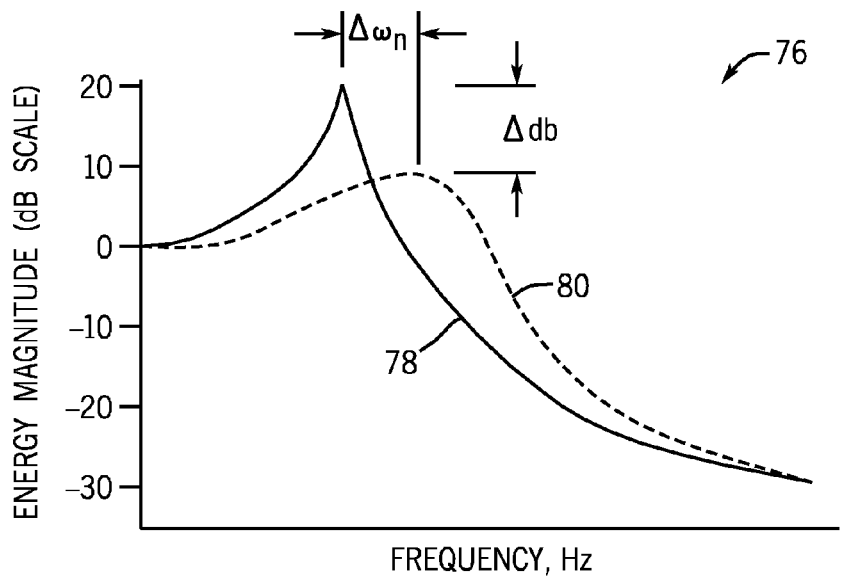
FIG. 7 is an exemplary chart of energy magnitude versus frequency of the jumper system of FIG. 1, illustrating the impact of encasing the pipes of the jumper system within a viscoelastic material.

Wrapping the pipes 26, 28, 30, 34, 36, 38, and 42 of the jumper system 18 with the first, second, and third layers of material 62, 64, 66 as described above may result in substantial reduction in the energy magnitude experienced by the jumper system 18 over time. For example, FIG. 7 is an exemplary chart 76 of energy magnitude versus frequency of the jumper system 18 of FIG. 1, illustrating the impact of encasing the pipes 26, 28, 30, 34, 36, 38, and 42 of the jumper system 18 within a viscoelastic material. In particular, line 78 of FIG. 7 illustrates the energy experienced by the jumper system 18 over time when the first, second, and third layers of material 62, 64, 66 are not used on the pipes 26, 28, 30, 34, 36, 38, and 42 (e.g., as shown in the exemplary chart 60 in FIG. 3). Conversely, line 80 of FIG. 7 illustrates the energy experienced by the jumper system 18 over time when the first, second, and third layers of material 62, 64, 66 are used on the pipes 26, 28, 30, 34, 36, 38, and 42.

As illustrated by line 80, applying the first, second, and third layers of material 62, 64, 66 to the pipes 26, 28, 30, 34, 36, 38, and 42 may enable at least two specific benefits. First, the natural frequency $\omega_n$ of the jumper system 18 may be shifted, as illustrated by $\Delta\omega_n$, due to the addition of the first, second, and third layers of material 62, 64, 66. This may prove beneficial in that the "locked-in zone" (e.g., the range of frequencies within which the jumper system 18 may become locked-in, as described above) may be avoided. Second, the maximum energy magnitude of the jumper system 18 may be substantially reduced, as illustrated by $\Delta db$, due to the addition of the first, second, and third layers of material 62, 64, 66. For example, in certain embodiments, the energy magnitude of the jumper system 18 may be reduced by 5%, 10%, 15%, 20%, 25%, 30%, 35%, 40%, 45%, 50%, 55%, 60%, or greater, or any value in between. Thus, the jumper system 18 may generally experience less damage over the life cycle of the jumper system 18 due to the addition of the first, second, and third layers of material 62, 64, 66.

Although described herein as applying to the pipes 26, 28, 30, 34, 36, 38, and 42 of the jumper system 18, the application of the first, second, and third layers of material 62, 64, 66 as described herein may prove beneficial for any other types of pipes which may experience flow of fluids over either internal or external surfaces. For example, any type of sub-sea pipes may benefit from the addition of the first, second, and third layers of material 62, 64, 66 as described herein. In addition, aboveground pipelines that experience high levels of wind may also benefit from the addition of the first, second, and third layers of material 62, 64, 66 as described herein. Indeed, the first, second, and third layers of material 62, 64, 66 may be used on any structures above ground, in water, or otherwise generally subject to fluid flow (e.g., liquid or gas).

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
a multi-layer composite strip of vibration dampening materials, comprising a first layer of a first material, and a second layer of a second material disposed adjacent to the first layer of material, and a third layer of a third material disposed adjacent the first layer, wherein the first material comprises a viscoelastic material that completely fills a space between the second layer and the third layer, and wherein the multi-layer composite strip of vibration dampening materials is configured to be affixed to an outer surface of a section of pipe having a fluid passage.

2. The system of claim 1, comprising an adhesive disposed on a side of the first layer opposite to the second layer.

3. The system of claim 1, wherein the viscoelastic material comprises a viscoelastic polymer.

4. The system of claim 1, wherein the first layer has a first dampening value, and the second layer has a second dampening value, and wherein the first dampening value is substantially greater than the second dampening value.

5. An oil and gas extraction system, comprising:
an extraction component;
a section of pipe having a fluid passage, wherein the section of pipe is coupled to the extraction component; and
a multi-layer composite strip of pipe dampening materials coupled to the section of pipe and configured to bend and absorb vibration of the pipe section, wherein the multi-layer composite strip of pipe dampening materials comprises a first layer of a first material, and a second layer of a second material disposed adjacent to the first layer of material, wherein the first material comprises a viscoelastic material, and wherein the multi-layer composite strip of pipe dampening materials is affixed to an outer surface of the section of pipe.

6. The system of claim 5, comprising an adhesive disposed on a side of the first layer opposite to the second layer.

7. The system of claim 5, wherein the viscoelastic material comprises a viscoelastic polymer.

8. The system of claim 5, wherein the section of pipe has a first thickness and a first stiffness value and the second layer has a second thickness and a second stiffness value, wherein the first stiffness value and the second stiffness value are substantially different.

9. The system of claim 8, wherein the first stiffness value and the second stiffness value are different by at least approximately 20%.

10. The system of claim 9, wherein the section of pipe comprises a third material, and wherein the third material is the same as the second material, and the second thickness is substantially thinner than the first thickness.

11. The system of claim 9, wherein the section of pipe comprises a third material, and wherein the third material is different than the second material, and the second thickness is substantially thinner than the first thickness.

12. The system of claim 5, wherein the first layer has a first dampening value, and the second layer has a second dampening value, and wherein the first dampening value is substantially greater than the second dampening value.

13. The system of claim 5, comprising a plurality of multi-layer composite strips of pipe dampening materials.

14. A system, comprising:
a multi-layer composite strip of pipe dampening materials, comprising a first layer of a first material, a second layer of a second material disposed over the first layer of material, and a third layer of a third material disposed over the second layer of material, wherein the second material comprises a viscoelastic material that enables the first and third layers to move radially with respect to each other, and wherein the multi-layer composite strip of pipe dampening materials is configured to be affixed to an outer surface of a section of pipe having a fluid passage.

15. The system of claim 14, comprising an adhesive disposed on a side of the first layer opposite to the second layer.

16. The system of claim 14, wherein the viscoelastic material comprises a viscoelastic polymer.

17. The system of claim 14, wherein the first layer has a first thickness, a first stiffness value, and a first dampening value, the second layer has a second thickness, a second stiffness value, and a second dampening value, and the third layer has a third thickness, a third stiffness value, and a third dampening value, and wherein the first stiffness value is substantially different than the third stiffness value.

18. The system of claim 17, wherein the first stiffness value and the third stiffness value are different by at least approximately 20%.

19. The system of claim 17, wherein the first thickness is substantially different than the third thickness.

20. The system of claim 17, wherein the second dampening value is substantially greater than both the first dampening value and the third dampening value.

21. The system of claim 1, wherein the viscoelastic material enables the second and third layers to move radially with respect to each other.

22. The system of claim 5, wherein the extraction component comprises a wellhead.

23. The system of claim 5, wherein the section of pipe comprises a jumper cable.

24. The system of claim 14, wherein the viscoelastic material completely fills a space between the first layer and the third layer.

25. The system of claim 14, wherein the viscoelastic material at least substantially fills a space between the first layer and the third layer.

26. The system of claim 5, comprising a third layer of a third material disposed adjacent to the first layer, wherein the viscoelastic material enables the second and third layers to move radially with respect to each other.

* * * * *